US005484038A

United States Patent [19]
Rowell

[11] Patent Number: 5,484,038
[45] Date of Patent: Jan. 16, 1996

[54] BICYCLE CHAIN LUBRICATING DEVICE

[76] Inventor: Mark M. Rowell, 38 Alviso Ct., Pacifica, Calif. 94044

[21] Appl. No.: 413,801

[22] Filed: Mar. 30, 1995

[51] Int. Cl.$^6$ .................................... B61K 3/00
[52] U.S. Cl. .................. 184/15.1; 184/16; 280/288.4; 474/91; 474/92
[58] Field of Search ................... 184/15.1, 15.2, 184/15.3, 16; 474/91, 92; 280/288.4

[56] References Cited

U.S. PATENT DOCUMENTS

| | | | |
|---|---|---|---|
| 603,654 | 5/1898 | Norris | 184/15.1 |
| 3,931,991 | 1/1976 | Marchello . | |
| 4,593,923 | 6/1986 | Thalmann . | |
| 4,891,037 | 1/1990 | Maples | 184/15.1 |
| 5,020,637 | 6/1991 | Hoenselaar et al. | 184/15.1 |
| 5,213,180 | 5/1993 | Masonek et al. | 184/15.1 |

Primary Examiner—Edward K. Look
Assistant Examiner—Christopher Verdier
Attorney, Agent, or Firm—Jack Lo

[57] ABSTRACT

A bicycle chain lubricating device includes a housing (10) with an elongated channel (17) extending therethrough, and a lubricant hole (16) extending between an exterior surface of the housing and the channel. A set of brushes (19) are mounted within the channel. The housing is separable into upper and lower housings (11, 12) along the channel for receiving a portion of a bicycle chain (30) therebetween. An anchoring hook (24) extending from the housing anchors it to the bicycle. In use, the chain is moved through the channel by cranking the pedals backwardly, and a lubricant (32) is introduced into the lubricant hole. As the chain is moved through the channel, the brushes distribute the lubricant along the chain. Because all the lubricant is efficiently directed at the chain, only a minimal amount of lubricant is needed. The housing confines the lubricant therein to keep the bicycle and the surrounding area clean.

11 Claims, 3 Drawing Sheets

5,484,038

BICYCLE CHAIN LUBRICATING DEVICE

BACKGROUND OF THE INVENTION

A typical bicycle has a chain for transmitting power from the pedal-driven sprocket to the gears on the rear wheel. The chain normally requires regular lubrication and cleaning for reducing friction and wear, and to prevent rusting. The chain is typically lubricated by dripping or spraying lubricant along its entire length. However, dripping lubricant one drop at a time onto a chain is time consuming, and the lubricant frequently falls onto other parts of the bicycle or the ground and must be cleaned or can discolor floors or concrete. Applying lubricant with a spray can cause an even bigger problem because of the unavoidable over spray. Although some spray cans are provided with a tube attachable to the nozzle for narrowing the spray into a fine stream, the stream can easily be misdirected, miss the chain, and cause a problem. Further, any lubricant that drops on the bicycle's wheel rims may prevent the brakes from working—a potentially disastrous result.

U.S. Pat. No. 3,931,991 to Marchello (1976) shows a bicycle chain cleaning device that includes a panel which is positioned behind the drive sprocket and gears of a bicycle. It includes several rollers for guiding the chain through a cleaning solution held in an open reservoir. Although the reservoir can be used for holding a lubricant instead as much as several cups of lubricant are required to allow the chain to be properly submerged thereunder. However, soaking the chain will cause it to pick up far too much lubricant, which will fling out when it is cranked around. In addition, the device is difficult to install, because the chain must be carefully threaded through its series of rollers. Furthermore, the lubricant can easily spill out of the open reservoir when the device is being installed or removed. The large volume of used lubricant must also be disposed of, which becomes an environmental contaminant. Bicycle lubricant is expensive, so the disposal of excess lubricant is a wasteful practice.

U.S. Pat. No. 4,593,923 to Thalmann (1986) shows a bicycle chain cleaning device that includes a housing with entry and exit holes for moving a chain therethrough. A roller mounted in the housing guides a chain into a sump of cleaning solution, and a set of brushes wipe the chain clean. Like the Marchello device, the Thalmann device can also be used for holding lubricant instead. However, a large volume of lubricant must be also deposited in the sump to properly soak the chain, which will pick up too much lubricant. The lubricant can also easily spill out when the device is being installed or removed. The excess, but expensive, lubricant must also be disposed of, i.e., wasted. Furthermore, the user must hold the housing with one hand while turning the pedals with the other hand to prevent the housing from moving forward.

OBJECTS OF THE INVENTION

Accordingly, several objects of the present invention are to provide an improved bicycle chain lubricating device, to provide a bicycle chain lubricating device which confines the lubricant therein to keep the rest of the bicycle and the surrounding area clean, to provide a bicycle chain lubricating device which minimizes the use of lubricant, and catches any excess lubricant to prevent it from leaking out, to provide a bicycle chain lubricating device which can be easily installed or removed from a bicycle.

Other objects of the present invention are to provide a bicycle chain lubricating device which can be folded into a compact shape for storage, and which thoroughly lubricates the entire length of a bicycle chain.

Further objects of the invention will become apparent from a study of the drawing figures and the following description.

SUMMARY OF THE INVENTION

A bicycle chain lubricating device includes a housing with a channel extending therethrough for receiving a portion of a bicycle chain. A lubricant hole extends between an exterior surface of the housing and the channel. A set of brushes are mounted within the channel. When the chain is moved through the channel by cranking the pedals of the bicycle, a lubricant can be introduced into the hole for coating the entire length of the chain. The brushes distribute the lubricant throughout the chain, and wipe off any excess lubricant to prevent dripping. An anchoring hook attached to the housing can be hooked onto the bicycle to prevent the housing from moving forward as the chain is moving therethrough.

DRAWINGS REFERENCE NUMERALS

10. Housing
11. Upper Housing
12. Lower Housing
13. Grooves
14. Pin
15. Brushes
16. Lubricant Hole
17. Channel
18. Rails
19. Brushes
20. Sump
21. Locking Arm
22. Hole
23. Pivot
24. Anchoring Hook
25. Hole
26. Pivot
27. Curved Slot
28. Curved Slot
29. Bicycle
30. Chain
31. Derailleur
32. Lubricant
33. Container

DESCRIPTION—FIG. 1

Figure 1:
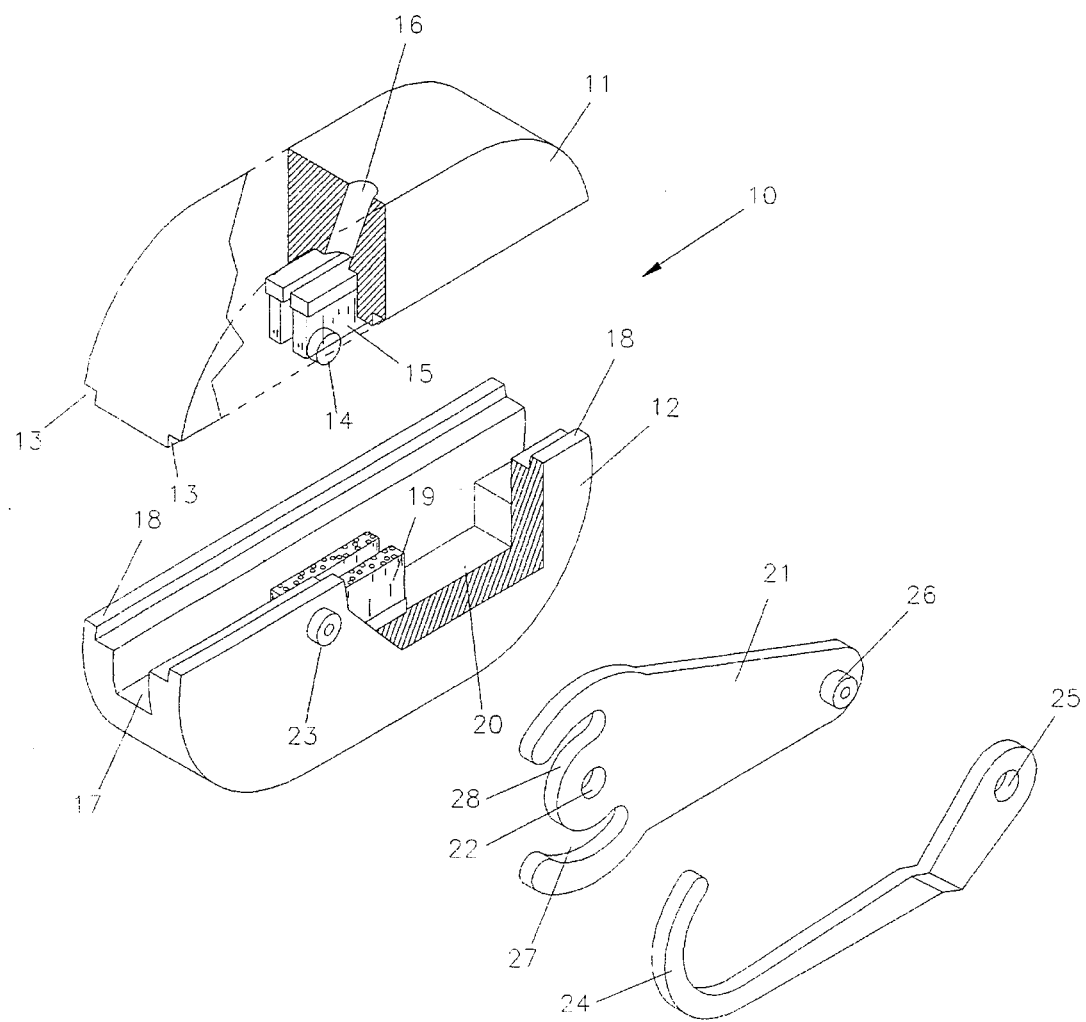
FIG. 1 is an exploded from perspective view of a bicycle chain lubricating device in accordance with a preferred embodiment of the invention.

In accordance with a preferred embodiment of the invention shown in the exploded front perspective view in FIG. 1, a bicycle chain lubricating device includes a housing 10 formed of an upper housing 11 and a lower housing 12.

Upper housing 11 includes a pair of grooves 13 extending along its lower edges, and a pin 14 extending from its front side. A pair of spaced apart brushes 15 are partially recessed into the bottom side of upper housing 11, and a lubricant hole 16 extends between its top side and brushes 15.

Lower housing 12 includes an elongated channel 17 extending along its upper side, and a pair of rails 18 for mating with grooves 13 of upper housing 11. A pair of brushes 19 are attached to a sump 20 in lower housing 12.

A locking arm 21 includes a hole 22 which is rotatably mounted on a pivot 23 extending from the front side of lower housing 12. An anchoring hook 24 includes a hole 25 which is rotatably mounted on a pivot 26 extending from one end of locking arm 21. Locking arm 21 also includes a pair of open-ended curved slots 27 and 28 formed around hole 22.

In this example, housing 10 is about 10 cm long, 7 cm high, and 2.5 cm thick. Brushes 19 are made of nylon, and are each about 2.5 cm long and 1.2 cm tall.

DESCRIPTION—FIG. 2

Figure 2:
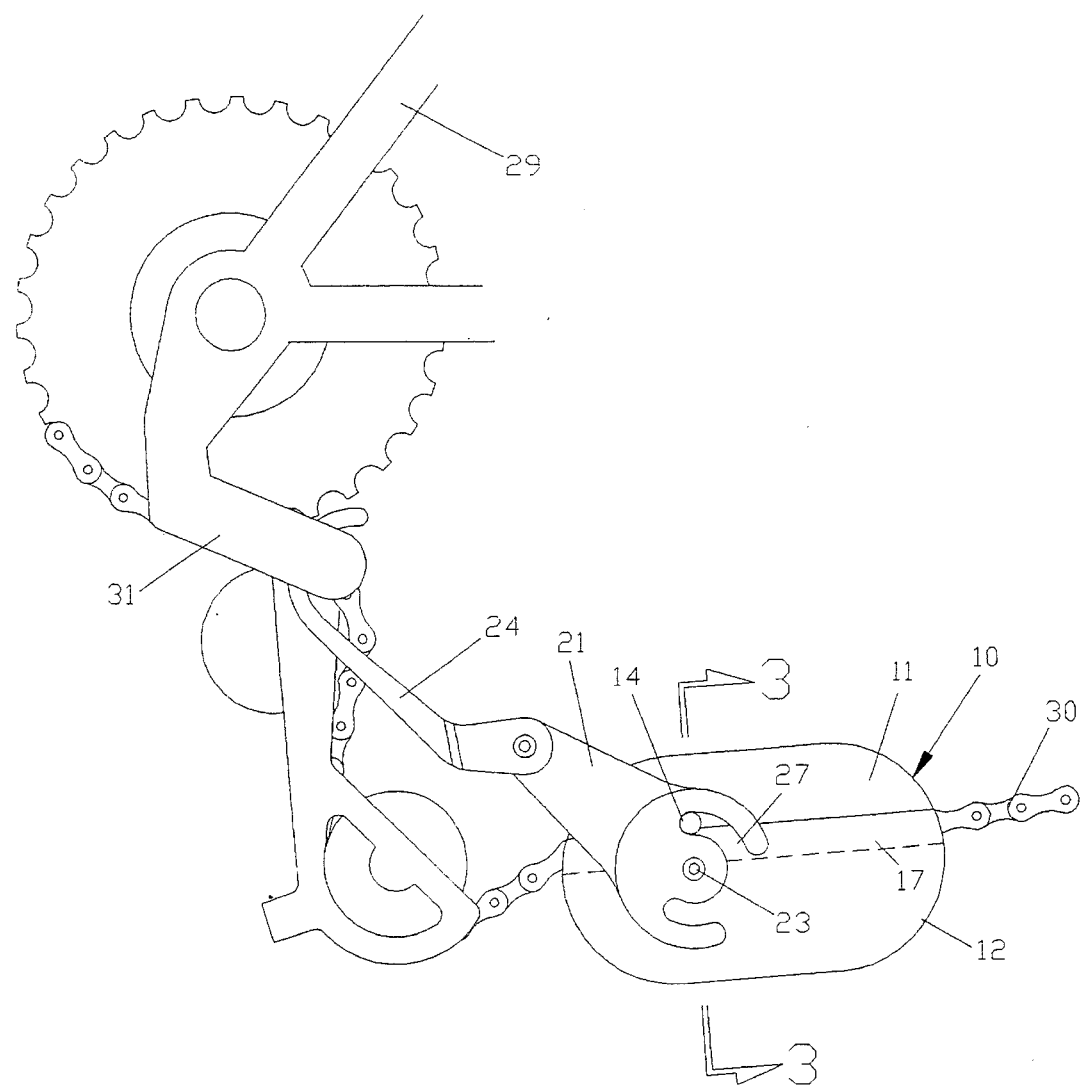
FIG. 2 is a side view of the bicycle chain lubricating device mounted on a bicycle.

The bicycle chain lubricating device of FIG. 1 is shown mounted on a bicycle 29 in FIG. 2. Channel 17 is positioned around a portion of a chain 30 of bicycle 29, and upper housing 11 is mated onto lower housing 12. Locking arm 21 is rotated about pivot 23 so that curved groove 27 is slid around pin 14 to lock upper and lower housings 11 and 12 together. Anchoring hook 24 is hooked around an arm of derailleur 31 to keep housing 10 from moving forward.

OPERATION—FIG. 3

Figure 3:
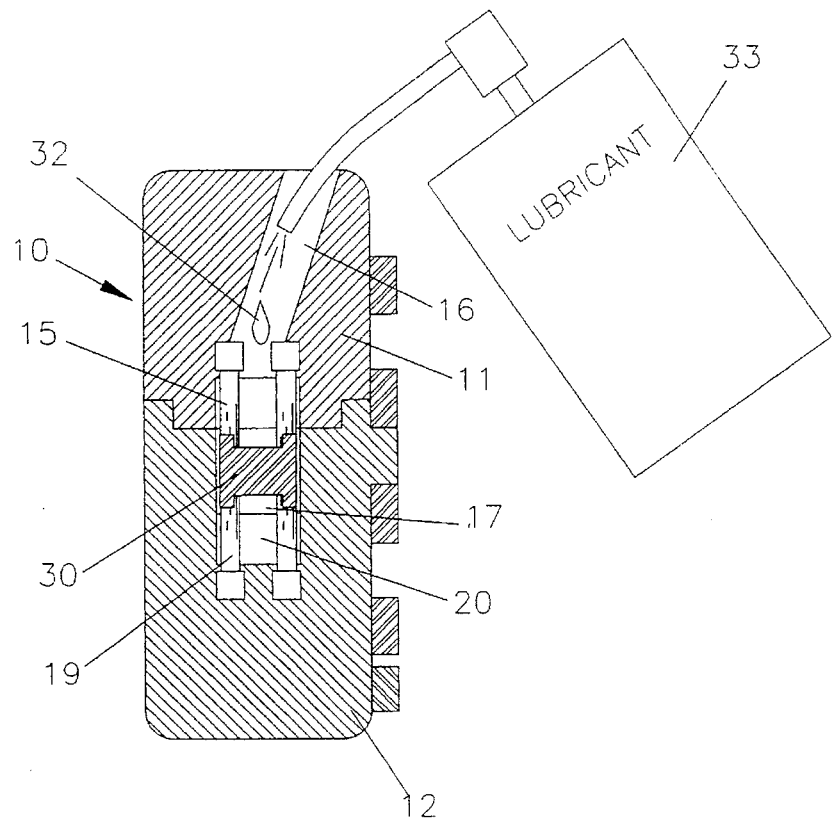
FIG. 3 is a partial sectional end view of the bicycle chain lubricating device, taken along line 3—3 in FIG. 2.

The operation of the bicycle chain lubricating device of FIG. 1 is best illustrated in the partial sectional end view of FIG. 3, taken along line 3—3 in FIG. 2. When upper and lower housings 11 and 12 are mated together, lubricant hole 16 communicates with channel 17.

In use, to lubricate a chain 30, the device is installed as shown in FIG. 2. Then chain 30 is cranked all the way around by turning the pedals (not shown) backwardly, and dripping or shooting a lubricant 32 through lubricant hole 16 to coat the entire length of chain 30. Because housing 10 is hooked onto bicycle 29 (FIG. 2), it will not move forward when chain 30 is cranked around. This leaves the user with a free hand to hold container 30. Brushes 15 and 19 perform several functions: they prevent lubricant 32 from splattering outside housing 10, they spread lubricant 32 thoroughly around all sides of chain 30, and they wipe off excess lubricant 32 from chain 30 to prevent dripping.

Lubricant 32 is entirely confined within housing 10, so that bicycle 29 (FIG. 2), especially its wheel rims (not shown), and the surrounding area are kept clean. The confinement of lubricant 32 and the spreading action of brushes 15 and 19 make the coating process very efficient, so that a minimal amount of lubricant 32 is used. Any excess lubricant 32 will be collected in sump 20, but will usually be no more than a few drops, so that it can be easily wiped away with a paper towel.

In this example, lubricant 32 is a lightweight, "Teflon" fortified bicycle chain lubricant.

DESCRIPTION—FIG. 4

Figure 4:
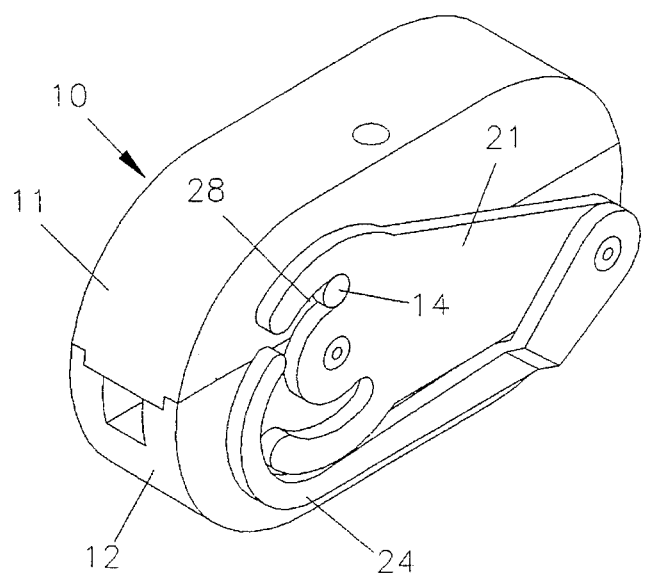
FIG. 4 is a from perspective view of the bicycle chain lubricating device in a folded condition for storage.

After use, housing 10 can be split apart and removed from chain 30 (FIG. 2), and reassembled together, as shown in FIG. 4. Locking arm 21 is rotated so that curved slot 28 is slid around pin 14 to lock upper and lower housings 11 and 12 together. Hook 24 is folded against locking arm 21, so that the device assumes a compact shape for storage.

CONCLUSION, RAMIFICATIONS, AND SCOPE

Accordingly, the reader will see that I have provided a bicycle chain lubricating device that thoroughly lubricates the entire length of a bicycle chain. It confines the lubricant therein to keep the rest of the bicycle and the ground clean. It minimizes the amount of lubricant used in the process. It catches any excess lubricant, which is usually no more than a few drops, so that it can be easily wiped away with a paper towel. It is very easy to install and remove from a bicycle. It can also be folded into a compact shape for storage.

Although the above descriptions are specific, they should not be considered as limitations on the scope of the invention, but only as examples of the preferred embodiment. Many other ramifications and variations are possible within the teachings of the invention. For example, the upper and lower housings can be hingeably attached along their back sides, and latched together at their front sides, instead of being attached together with the locking arm. The anchoring hook can be attached directly to the housing. The brushes can be made removable, so that they can be replaced when worn. The lubricant hole can be positioned in the lower housing, and extends into the channel through the front side thereof. More or fewer brushes can be used. The brushes can be replaced with other suitable porous lubricant holding and distribution devices, such as sponges or wadding. The anchoring hook can hook onto other parts of the bicycle, or it can be replaced with another suitable anchoring device, such as a clip that clips onto the frame of the bicycle. Therefore, the scope of the invention should not be determined by the examples given, but by the appended claims and their legal equivalents.

I claim:

1. A bicycle chain lubricating device, comprising:

a housing having an elongated channel extending therethrough, said channel being sized to slidably receive a portion of a bicycle chain, and a lubricant hole extending between an exterior surface of said housing and said channel for directing a lubricant introduced thereinto onto said bicycle chain, so that when said bicycle chain is slidably moved through said channel, said lubricant is deposited along said bicycle chain, wherein said housing comprises separable upper and lower housings, and locking means for locking said upper and lower housings together, said locking means comprising a pin extending from said upper housing, and a locking arm pivotally attached to said lower housing, said locking arm including an open ended curved slot, so that said locking arm is rotatable to position said curve slot around said pin.

2. The bicycle chain lubricating device of claim 1 wherein said exterior surface comprises a top surface.

3. The bicycle chain lubricating device of claim 1, further including a body of a porous, oil-holding device positioned in said channel.

4. A bicycle chain lubricating device, comprising:

a housing having an elongated channel extending therethrough, said channel being sized to slidably receive a portion of a bicycle chain, a porous oil-holding device mounted within said channel and positioned to contact said chain when said chain is positioned in said channel, and a lubricant hole extending between an exterior surface of said housing and said channel for directing a lubricant introduced thereinto onto said porous oil-holding device, so that when said bicycle chain is slidably moved through said channel, said porous oil-holding device distributes said lubricant along said bicycle chain, wherein said housing comprises separable upper and lower housings, and locking means for locking said upper and lower housings together, said locking means comprising a pin extending from said upper housing, and a locking arm pivotally attached to said lower housing, said locking arm including an open ended curved slot, so that said locking arm is rotatable to position said curved slot around said pin.

5. The bicycle chain lubricating device of claim 4 wherein said exterior surface comprises a top surface.

6. The bicycle chain lubricating device of claim 4, further including an additional porous oil-holding device mounted in said channel opposite said porous oil-holding device for sandwiching said bicycle chain therebetween for thoroughly distributing said lubricant therealong.

7. The bicycle chain lubricating device of claim 6 wherein said porous oil-holding device is a brush.

8. A bicycle chain lubricating device for lubricating a bicycle chain mounted on a bicycle, comprising:

a housing having an elongated channel extending therethrough, said channel being sized to slidably receive a portion of said bicycle chain, said housing comprising separable upper and lower housings, a porous oil-holding device mounted within said channel for contacting said chain when said chain is introduced into said channel, anchoring means for anchoring said housing to said bicycle, and a lubricant hole extending between an exterior surface of said housing and said channel for directing a lubricant introduced thereinto onto said porous oil-holding device, so that when said bicycle chain is slidably moved through said channel, said porous oil-holding device distributes said lubricant along said bicycle chain, and said anchoring means maintains said housing in a stationary position while said bicycle chain is moved therethrough, and locking means for locking said upper and lower housings together, said locking means comprising a pin extending from said upper housing, and a locking arm pivotally attached to said lower housing, said locking arm including an open ended curved slot, so that said locking arm is rotatable to position said curved slot around said pin.

9. The bicycle chain lubricating device of claim 6 wherein said exterior surface comprises a top surface.

10. The bicycle chain lubricating device of claim 8 wherein said anchoring means comprises a hook.

11. The bicycle chain lubricating device of claim 8, further including an additional porous oil-holding device mounted in said channel opposite said porous oil-holding device for sandwiching said bicycle chain therebetween for thoroughly distributing said lubricant therealong.

\* \* \* \* \*